Nov. 21, 1967  J. O. SARTO  3,353,524
METHOD OF OPERATING AN AUTOMOTIVE ENGINE
Original Filed Oct. 23, 1963  2 Sheets-Sheet 2

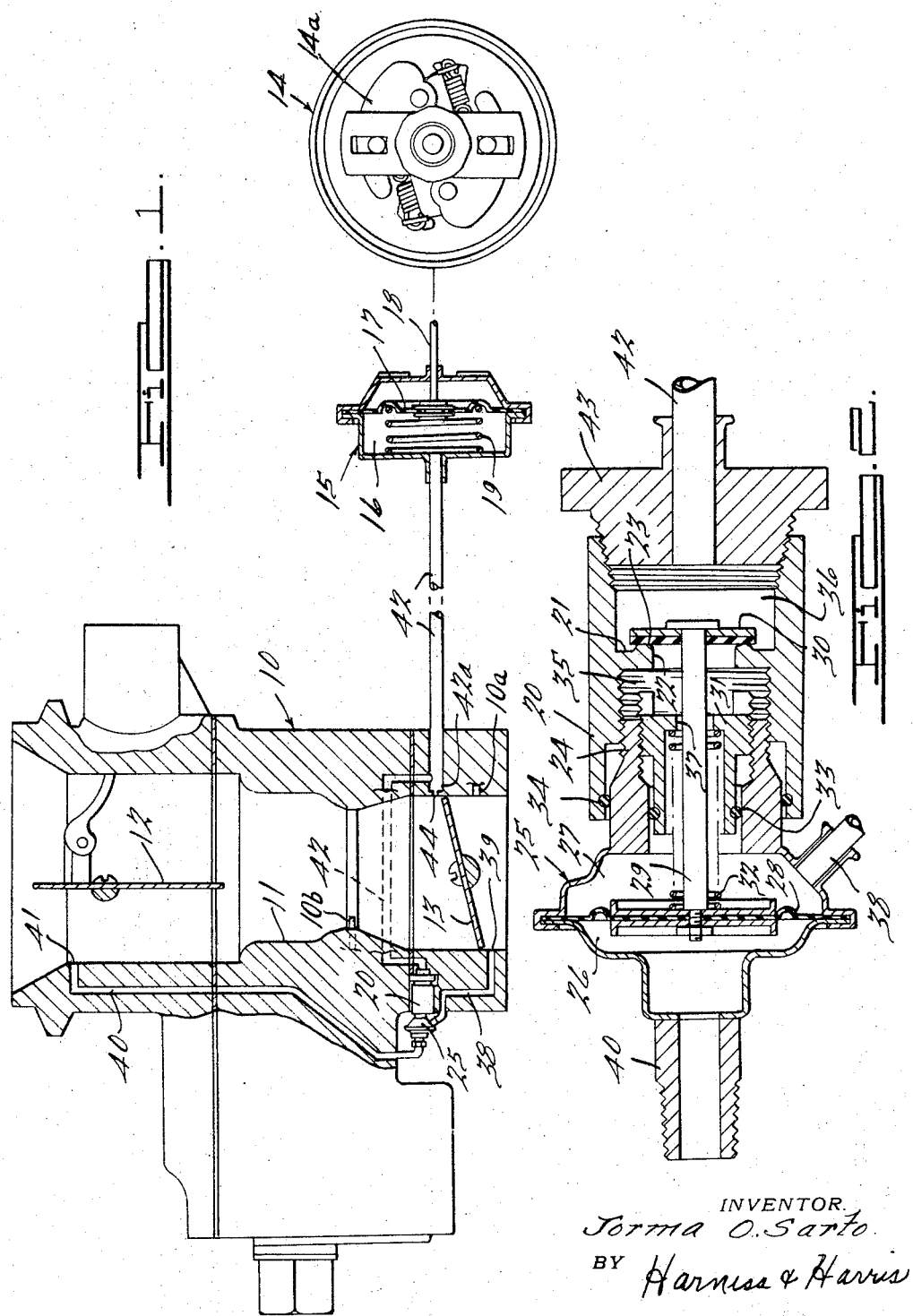

INVENTOR.
Jorma O. Sarto.
BY Harness & Harris
ATTORNEYS

United States Patent Office 3,353,524
Patented Nov. 21, 1967

3,353,524
METHOD OF OPERATING AN AUTOMOTIVE ENGINE
Jorma O. Sarto, Orchard Lake, Mich., assignor to Chrysler Corporation, Highland Park, Mich., a corporation of Delaware
Original application Oct. 23, 1963, Ser. No. 318,285, now Patent No. 3,252,457, dated May 24, 1966. Divided and this application Oct. 13, 1965, Ser. No. 495,588
10 Claims. (Cl. 123—117)

ABSTRACT OF THE DISCLOSURE

An approximately stoichiometric fuel-air mixture is supplied to a piston-type automotive engine during idle and coasting conditions, the ignition spark distributor being adjusted to retard ignition until after the piston has passed its top center position during low speed coasting, and being adjusted to advance the ignition to approximately cruising condition during coasting at cruising speeds.

This application is a division of my copending application Ser. No. 318,285, filed Oct. 23, 1963, issued May inlet induction conduit or manifold so as to achieve improvement in carburetion for a piston type vehicle internal combustion engine and in particular to a method of operating such an engine by advancing the engine ignition spark distributor during deceleration or coasting and retarding the ignition distributor during normal engine idling in response to the pressure in the fuel-air inlet induction conduit or manifold so as to achieve improved combustion and to minimize the exhausting of unburned hydrocarbons.

It has been common heretofore to advance and retard the ignition distributor in accordance with engine speed and manifold pressure. For example it has been customary during engine idling to advance the distributor to fire when the engine piston is approximately 10° of crankshaft rotation in advance of its top-most or dead-center position and thereafter to progressively advance the distributor with increasing engine speed. Operation under such conditions results in optimum fuel economy but requires a fuel-air ratio during engine idling appreciably greater than the stoichiometric ratio of approximately .067 pound of fuel per pound of air which supplies the minimum air required for complete combustion of the fuel. Furthermore, during engine coasting above approximately 25 miles per hour in high gear, the inlet manifold vacuum rises to between 22 and 25 inches of mercury (i.e., the absolute pressure falls) at which low pressures under conventional operating conditions, failure of engine combustion usually occurs and large amounts of unburned hydrocarbons are exhausted to the atmosphere.

It has been found that if the ignition spark distributor is retarded to fire when the piston is approximately 5 to 15 degrees of crankshaft rotation beyond its top or dead-center position, the engine can be idled with an appreciably leaner fuel-air mixture approximating the stoichiometric ratio, provided that the fuel consumption is increased slightly above the customary idling value for optimum fuel economy. In consequence, the exhausting of unburned hydrocarbons is materially reduced. For example, an engine that would customarily idle at a fuel-air ratio of .087 pound of fuel per pound of air and an air consumption of 35 pounds per hour can be operated to effect almost complete fuel combustion at a fuel-air ratio of .070 pound of fuel per pound of air and an air consumption of 54 pounds per hour merely by retarding the spark at idle to fire at 5° of crankshaft rotation after the dead-center position, rather than at the customary 10° in advance of the dead-center position.

In addition, by retarding the spark and increasing the fuel consumption as above, the engine can be operated without combustion failure at a manifold vacuum in excess of 22 inches of mercury. Accordingly slow speed coasting, as for example in city traffic with the throttle closed to the idle condition, does not appreciably increase the unburned hydrocarbon content of the exhaust. At higher coasting speeds, as for example in excess of approximately 25 miles per hour in high gear and at the idle throttle position, it is preferred to advance the ignition spark as the manifold vacuum increases, in order to obtain substantially complete combustion of the fuel.

An important object of the present invention is to provide an improved method of engine operation by advancing or retarding the ignition spark in response to manifold intake pressure, so as to retard the spark during idling and low speed coasting and to advance the spark rapidly when the coasting speeds exceed a predetermined value, as for example 25 miles per hour, or when the induction conduit vacuum rises above the idling value of approximately 19 or 20 inches of mercury.

Other objects of this invention will appear in the following description and appended claims, reference being had to the accompanying drawings forming a part of this specification wherein like reference characters designate corresponding parts in the several views.

FIGURE 1 is a schematic view showing a carburetor in section and embodying an ignition spark control mechanism operatively connected with an ignition spark distributor.

FIGURE 2 is an enlarged longitudinal mid-sectional view through the valve mechanism responsive to the induction pressure.

Figure 3:
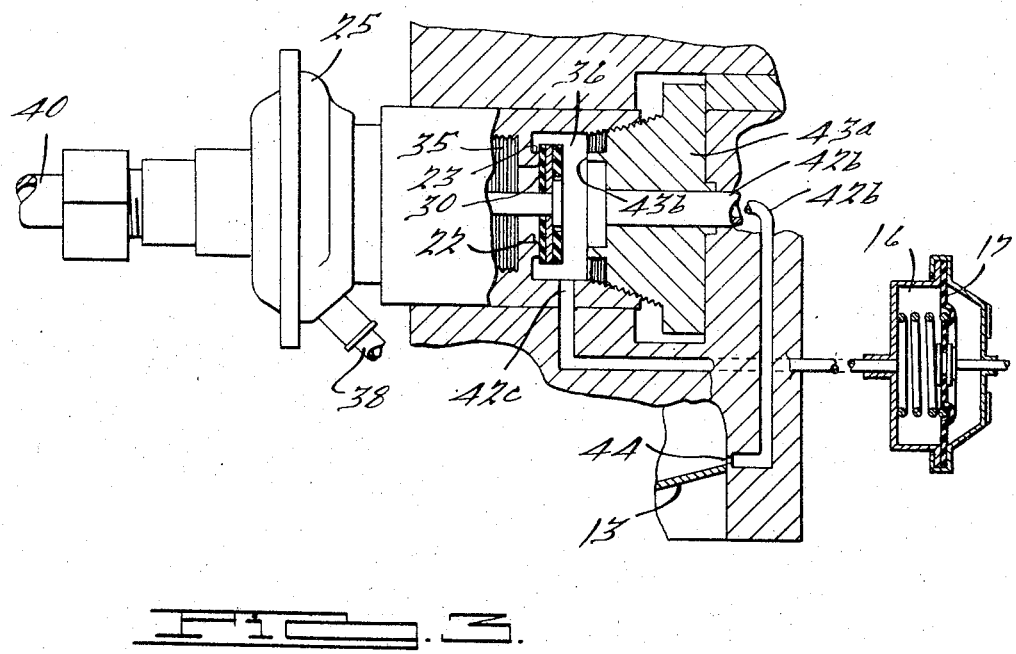
FIGURE 3 is a view similar to FIGURE 2, illustrating a modification of the invention.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to FIGURES 1 and 2, a particular application of the present invention is illustrated by way of example with a carburetor 10 having a typical air inlet induction manifold or conduit 11, choke valve 12, and throttle valve 13. This structure may be conventional and will also embody the necessary idle fuel duct 10a and primary fuel duct 10b for admitting fuel to the induction conduit 11 during idle and load conditions of the engine for which the carburetor is provided.

Also associated with the engine is a conventional spark distributor 14 operatively connected with a distributor advancing and retarding mechanism which includes the customary flyweight type speed responsive governor mechanism 14a for advancing the ignition with increasing speed and also includes a pressure responsive means indicated generally by the numeral 15 and comprising a pressure chamber 16 defined in part by a movable wall or flexible diaphragm 17. The latter is connected with a reciprocal plunger 18 which in turn is operatively connected with the distributor 14 to advance or retard the timing of the engine spark or firing in cooperation with the governor mechanism 14a in accordance with leftward or rightward movement respectively of diaphragm 17 and plunger 18 in FIGURE 1.

A biasing spring 19 normally maintains the distributor in a retarded condition to cause spark or firing in the cylinder concerned at between approximately 5 to 15 degrees of crankshaft rotation after the engine piston has passed its top or dead-center position when the engine is idling normally. In this regard, with the ignition spark retarded as aforesaid, the carburetor is adjusted to supply fuel at an accelerated rate with respect to customary engine idling but at an appreciably leaner fuel-air mixture approximating the stoichiometric ratio of about .070 pound of fuel per pound of air. During engine idling and also during coasting of the engine, the throttle valve 13 is substantially closed and the pressure in conduit 11 downstream of throttle valve 13 is low. When the engine is coasting at speed greater than 25 miles per hour, the vacuum downstream of throttle valve 13 will frequently rise to between 22 and 25 inches of mercury.

In order to advance the ignition spark in response to an increased vacuum downstream of throttle valve 13 during deceleration or coasting in gear, a valve is provided having a tubular housing with an intermediate inwardly directed annular restriction 21 around a port or opening 22. The restriction 21 terminates in an annular valve seat 23 coaxial with opening 22 and tubular housing 20. An internally threaded portion of the housing 20 screws on an externally threaded portion 24 of the housing 25 of a pressure actuated device partitioned into two chambers 26 and 27 by means of a movable wall or flexible diaphragm 28. The latter is secured around its periphery to the housing 25 and is secured centrally to a reciprocal shaft 29 to actuate the latter in accordance with the pressure differential across diaphragm 28.

The shaft or plunger 29 extends coaxially into housing 20 and through opening 22 and is secured at its right end to a suitable valve member or disc 30 adapted to seat at the annular valve seat 23 and close opening 22. A tubular spring retainer 31 arranged coaxially around plunger 29 screws into an internally threaded portion of extension 24 and provides an abutment for one end of a spring 32 coiled around shaft 29 and seated at its other end against a rigid portion of diaphragm 28 to urge the latter leftward in FIGURE 2, thereby to maintain valve 30 in its closed position seated against seat 23. Suitable annular seals 33 and 34 are provided between extension 24 and retainer 31 and housing 20 respectively to maintain a leak-proof enclosure for chamber 27.

The extension 21 in cooperation with valve 30 serves to partition housing 20 into two chambers 35 and 36, the chamber 35 being in continuous unrestricted communication with chamber 27 via central bore 37 in retainer 31 through which shaft 29 extends. The chambers 35 and 36 are in communication with each other when valve 30 is shifted rightward to its open position.

Chamber 27 is also maintained in unrestricted communication with conduit 11 by means of conduit 38 which opens into conduit 11 at port 39 downstream of throttle valve 13 when the latter is in its closed or idle position, FIGURE 1. It is to be noted that port 39 is proximate the edge of valve 13 that swings downwardly upon opening of that valve, so that upon opening of the throttle valve 13, port 39 will be in the high pressure air stream upstream of valve 13 and will thus be rendered ineffectual to cause opening of valve 30 as described below. Chamber 26 is maintained in unrestricted communication with atmospheric air by duct 40 which opens into conduit 11 at port 41 upstream of choke valve 12. Chamber 36 is maintained in unrestricted communication with chamber 16 by means of conduit 42, whereby diaphragm 17 is actuated in response to the pressure in chamber 36.

As illustrated in FIGURE 2, the left end of duct 42 is connected to chamber 36 by means of a tapered screw threaded fitting 43 which suitably seals the chamber 36. A restricted bleed port 44 opens into induction conduit 11 at a location adjacent to and upstream of throttle valve 13 when the latter is in its closed or idle position and is in communication with conduit 42 and therefore with chamber 36 by means of a duct extension 42a. Thus the substantially atmospheric pressure in conduit 11 upstream of valve 13 when the latter is closed is communicated to chambers 36 and 16 during equilibrium operation conditions of the engine. In the above regard, port 44 serves as the conventional distributor vacuum advance port for engine operation under cruising conditions when throttle valve is partially open.

Figure 4:
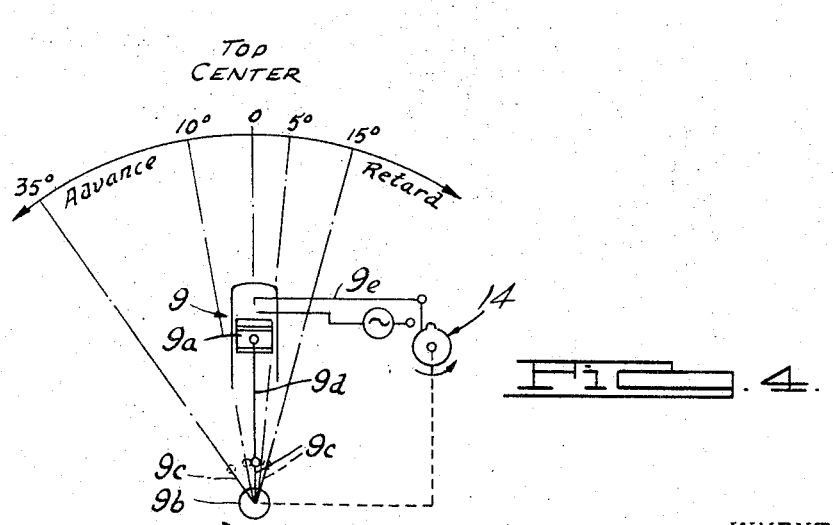
FIGURE 4 is a diagrammatic view showing the relationship between the piston and crankshaft of the vehicle engine at various advanced and retarded positions of the ignition spark distributor.

The vacuum advance port 44 is conventionally employed in cooperation with the speed responsive mechanism 14a for advancing the ignition spark with increasing speed until at about 30 m.p.h., the ignition spark or firing will occur at a predetermined angle of crankshaft rotation amounting to about 35° in advance of the top center position of the engine piston involved. Thus combustion in the engine cylinder will occur when the engine piston is adjacent its topmost position whereat optimum compression of the fuel-air mixture in the engine cylinder occurs, i.e., when the density of the fuel-air mixture is a maximum. Thus most of the fuel will be burned before being scavenged from the cylinder and optimum fuel economy will be achieved during cruising conditions. FIGURE 4 schematically illustrates the engine 9 with its piston 9a, crankshaft 9b, crankarm 9c, and connecting rod 9d at the top center position, and also at various angles of crankarm positions in phantom. The schematic ignition circuit is indicated generally by 9e cooperable with the distributor 14 and crankshaft 9b.

In operation of the structure described thus far, during normal idling conditions, spring 32 will maintain valve 30 at its closed position in opposition to the vacuum induced force on diaphragm 28 caused by the low pressure downstream of throttle valve 13. Thus the pressure in chamber 36, after equilibrium is established through restricted port 44, will be substantially atmospheric and will cooperate with spring 19 to urge the distributor 14 to its most retarded position, thereby to cause engine firing between 5° to 15° of crankshaft rotation beyond the top center position of the engine piston involved. During engine coasting or deceleration at slow speeds, the governor mechanism 14a will have no appreciable effect. As the coasting speed increases, the vacuum downstream of throttle valve 13 will gradually increase and also the governor mechanism will be increasingly effective to reduce the spark retardation. At a predetermined vacuum, as for example 20 inches of mercury which corresponds approximately to a coasting speed of 30 miles per hour, the low pressure at port 39 transmitted to chamber 27 will cause rightward shifting of diaphragm 28 and opening of valve 30 against the tension of spring 32.

It is to be noted that immediately upon opening of valve 30, the comparatively high pressure in chamber 36, acting on disc valve 30 to urge the latter closed, is dissipated through port 37 and conduit 38. In consequence, valve 30 operates somewhat as a poppet valve, such that after its initial opening, valve 30 will rapidly move to its fully open position. Small variations in manifold pressure will not cause it to close again until the coasting speed decreases to approximately 20 miles per hour. When valve 30 is open, the low pressure in chamber 36 will be transmitted via conduit 42 to chamber 16 to cause leftward movement of diaphragm 17 against the tension of spring 19, thereby in cooperation with the governor mechanism 14a to advance the distributor 14 to cause firing at approximately 35° of crankshaft rotation before the aforesaid top center position, i.e. at approximately the same angular position of the crankshaft 9b as would result during conventional cruising. Thus optimum combustion will occur during the period of maximum density of the fuel-air mixture, with a minimum discharge of unburned hydrocarbons to the atmosphere.

Also when valve 30 is open, air will be bled into induction conduit 11 downstream of throttle valve 13 via bleed port 44 and conduits 42a, 42, 37 and 38 to effect a slight dilution of the fuel-air mixture to the stoichiometric value or even lower as is frequently desirable in accordance with operating conditions.

Where it is undesirable to dilute the fuel-air mixture during high speed coasting, the structure is modified as illustrated in FIGURE 3 wherein most of the parts are the same in structure and operation as described above and are correspondingly numbered.

A significant difference in FIGURE 3 is that the tapered fitting 43 is replaced by a similar fitting 43a having an inwardly directed annular valve seat 43b adapted to be engaged by valve disc 30 when the latter is in its open position. Also, instead of being connected with chamber 16, fitting 43a is connected via conduit 42b with bleed port 44. Conduit 42b opens coaxially into chamber 36 within the confines of valve seat 43b, so that its connection with chamber 36 is blocked when valve 30 is in its open or rightward position. In FIGURE 3, chamber 36 is connected via conduit 42c with chamber 16 to actuate diaphragm 17 in accordance with the pressure in chamber 36 as described above in regard to FIGURES 1 and 2.

In operation of the structure illustrated in FIGURE 3, during normal idling or coasting at speeds less than approximately 30 m.p.h., valve 30 will be held in its leftward or closed position by spring 32 as illustrated in FIGURE 2. At coasting speeds in excess of 30 m.p.h., the low pressure downstream of throttle valve 13 will cause leftward shifting of diaphragm 28 and opening of valve 30. Prior to the opening of valve 30 the pressure in chamber 36 communicated thereto through duct 42b and bleed port 44 is substantially atmospheric, as described above. Accordingly, after the initial opening of valve 30, the pressure in chamber 36 is dissipated as described above to cause the poppet action of valve 30, whereby the latter rapidly opens fully and seats firmly at annular valve seat 43b, thereby to close the connection between chamber 36 and conduit 11 until the coasting speed slows to approximately 20 m.p.h. In consequence, when valve 30 is open, no bypass is provided around throttle valve 13 for diluting the fuel-air mixture. However, upon opening of valve 30, the low pressure in chamber 36 is communicated via conduit 42c to chamber 16 to move diaphragm 17 leftward and advance the ignition spark controlled by distributor 14 as described above.

I claim:

1. In the method of operating a piston type internal combustion engine for an automotive vehicle having a piston operated crankshaft rotatable through a top center position and having an acceptable idle operating condition at optimum fuel economy, an electrical ignition system adjustable for advancing or retarding its firing with respect to said top center position, a fuel charging device, and a throttle valve for said fuel charging device movable between idle and load positions, the steps of retarding said ignition system to fire after crankshaft rotation beyond said top center position and simultaneously maintaining combustion in said engine by supplying fuel to said engine in an approximately stoichiometric fuel-air mixture and at an accelerated rate with respect to said optimum fuel economy only while said engine is idling or coasting at low speed with said throttle valve at said idle position, and while supplying fuel substantially as above, advancing said ignition system to fire prior to crankshaft rotation to said top center position during coasting of said engine at higher speed with said throttle valve at said idle position.

2. In the method according to claim 1, said ignition system being retarded to fire between approximately 5° to 15° of crankshaft rotation beyond its top center position during said idling and slow speed coasting, and said ignition system being advanced to fire approximately 35° of crankshaft rotation in advance of said top center position during said higher speed coasting.

3. In the method of operating a piston type internal combustion engine for an automotive vehicle having a piston operated crankshaft rotatable through a top center position and having an acceptable idle operating condition at optimum fuel economy, an electrical ignition system adjustable for advancing or retarding its firing with respect to said top center position, a fuel charging device, and a throttle valve for said fuel charging device movable between idle and load positions, the steps of retarding said ignition system to fire after crankshaft rotation beyond said top center position only while said engine is idling or coasting at low speed with said throttle valve at said idle position, advancing said ignition system to fire prior to crankshaft rotation to said top center position while said engine is coasting at higher speed with said throttle valve at said idle position, and maintaining combustion in said engine during said idling and coasting with said throttle at said idle position by supplying fuel to said engine in an approximately stoichiometric fuel-air mixture and at an accelerated rate with respect to said optimum fuel economy.

4. In the method according to claim 3, said ignition system being retarded to fire at least 5° of crankshaft rotation beyond said top center position while said engine is idling or coasting at low speed with said throttle valve at said idle position.

5. In the method according to claim 4, said ignition system being advanced to approximately a cruising condition during coasting of said engine at cruising speeds with said throttle valve at said idle position.

6. In the method according to claim 4, said ignition system being advanced to approximately a cruising condition during coasting of said engine at cruising speeds with said throttle at said idle position, and simultaneously bleeding a comparatively small quantity of additional air into said fuel-air mixture.

7. In the method according to claim 3, said ignition system being retarded to fire beyond said top center position while said engine is idling or coasting at speeds up to approximately 20 miles per hour with said throttle valve at said idle position, and said ignition system being advanced to fire prior to said top center position while said engine is coasting at speeds greater than a predetermined speed not less than approximately 20 miles per hour with said throttle valve at said idle position.

8. In the method of operating a piston type internal combustion engine for an automotive vehicle having a piston operated crankshaft rotatable through a top center position and having an acceptable idle operating condition at optimum fuel economy, an electrical ignition system adjustable for advancing or retarding its firing with respect to said top center position, a fuel charging device, and a throttle valve for said fuel charging device movable between idle and load conditions, the steps of retarding said ignition system to fire after more than approximately 5° of crankshaft rotation beyond said top center position only while said engine is idling or coasting at low speed with said throttle valve at said idle position, and maintaining combustion in said engine during said idling and coasting with said throttle at said idle position by supplying fuel to said engine in an approximately stoichiometric fuel-air mixture and at an accelerated rate with respect to said optimum fuel economy.

9. In the method of operating a piston type internal combustion engine for an automotive vehicle having a piston operated crankshaft rotatable through a top center position and having an acceptable idle operating condition at optimum fuel economy, an electrical ignition system adjustable for advancing or retarding its firing with respect to said top center position and being adjustable to a cruising position for firing in advance of said top center position when said engine is operating at cruising speeds, a fuel charging device, and a throttle valve for said fuel charging device movable between idle and load conditions, the steps of retarding said ignition system to fire after crankshaft rotation beyond said top center position only while said engine is idling or coasting at low speed with said throttle valve at said idle position, advancing said ignition system to approximately said cruising position while said engine is coasting at cruising speeds with said throttle valve at said idle position, and maintaining combustion in said engine during said idling and coasting with said throttle at said idle position by supplying fuel to said engine in an approximately stoichiometric fuel-air mixture and at an accelerated rate with respect to said optimum fuel economy.

10. In the method of operating a piston type internal combustion engine for an automotive vehicle having a piston operated crankshaft rotatable through a top center position and adapted to idle acceptably at optimum fuel economy, an electrical ignition system adjustable for advancing or retarding its firing with respect to said top center position and being adjustable to a cruising position for firing in advance of said top center position when said engine is operating at cruising speeds, a fuel charging device having an induction conduit for supplying a fuel-air mixture to said engine, and a throttle valve in said induction conduit movable between idle and load positions, the steps of retarding said ignition system to fire after crankshaft rotation beyond said top center position only while said engine is idling or coasting with said throttle valve at said idle position at all speeds up to a predetermined speed corresponding to a pressure in said induction conduit at a location downstream of said throttle valve greater than a predetermined low pressure of approximately 20 inches of mercury below atmospheric pressure, advancing said ignition system to said cruising position while said engine is coasting with said throttle valve at said idle position at a cruising speed corresponding to pressures at said location less than said predetermined low pressure, and maintaining combustion in said engine during said idling and coasting with said throttle at said idle position by supplying fuel to said engine in an approximately stoichiometric fuel-air mixture and at an accelerated rate with respect to said optimum fuel economy.

References Cited

UNITED STATES PATENTS 3,272,191  9/1966  Walker _____ 123—117

OTHER REFERENCES

"Internal Combustion Engines," 1951, p. 6–3 SAE Journal; vol. 69, No. 9, p. 57, September 1961 123–32 STR.

RALPH D. BLAKESLEE, *Primary Examiner.*

MARK M. NEWMAN, *Examiner.*